2,918,376

FLAVORING SUBSTANCES AND THEIR PREPARATION

Charles Gerard May, St. Neots, and Philip Akroyd, Rushden, England, assignors to Lever Brothers Company, New York, N.Y., a corporation of Maine No Drawing. Application December 19, 1957
Serial No. 703,768

Claims priority, application Great Britain
December 27, 1956

20 Claims. (Cl. 99—140)

The present invention relates to artificial flavoring substances and to their preparation.

It has been found that flavoring substances capable of imparting to foodstuffs a smell or taste resembling that of ham or bacon, in many cases particularly resembling that of smoked ham or lightly smoked (cured) bacon, may be obtained by reacting an amino reagent comprising cysteine or cystine with fractionated liquid wood smoke in the presence of water and at an elevated temperature.

By "fractionated liquid wood smoke" is meant a smoke product obtained by dry distillation of wood in the presence of air, which smoke product has been condensed to a liquid. Condensation frees the product from a substantial proportion of the tar present in the distillate. Preferably, the liquid smoke is substantially completely freed from tar.

The present invention provides, therefore, a process for the preparation of an artificial flavoring substance which comprises reacting an amino reagent comprising cysteine or cystine with fractionated liquid wood smoke at an elevated temperature in the presence of water.

The fractionated liquid wood smoke is obtained by dry distillation of wood at a temperature at which slow combustion will occur, in the presence of air. For preference, the fractionated liquid wood smoke should be substantially freed from methyl alcohol by fractional distillation.

The wood used is preferably oak sawdust, but other woods, preferably in finely divided form, such as beech, hickory or ash can be used. Scented woods, such as cedar wood, may contain components which impart scented characteristics to the flavoring substance and their use may be either desirable or undesirable from this standpoint.

According to a preferred embodiment the temperature at which distillation is carried out is in the range 300 to 500° C., a temperature of about 400° C. being highly preferred. The air flow during distillation should preferably be controlled so as to avoid too rapid a rate of combustion and the quality of the fractionated liquid wood smoke may vary with the ratio of air flow to the surface area of wood used.

Generally, fractional distillation to remove methyl alcohol will substantially free the smoke from aliphatic acids, but, if necessary or desirable, acids present in the liquid wood smoke can be neutralized by alkali. Usually, the methyl alcohol present in the smoke is removed by distillation, preferably, in vacuo, which will concentrate the liquid wood smoke and also remove most of the acetic acid. The temperature of distillation preferably does not exceed 40° C. This concentrated smoke may be used as the reagent for reaction with the amino reagent, provided that sufficient water is present to permit reaction, but generally it is convenient to dilute the concentrated product with water. Generally, dilution to at least the original volume of the liquor prior to concentration should be made. Preferably a dilution of 10 to 20 times the original volume is made.

These solutions may be used for reaction with the amino reagent as described below.

Flavoring substances according to the invention may be obtained by using an amino reagent which consists of, or contains cysteine or cystine. Cysteine is to be preferred to cystine but mixtures of cysteine and cystine may be used if desired. Improved flavors are generally obtained by using an amino reagent comprising, in addition to cysteine or cystine, one of the following amino acids: threonine, proline, glutamic acid, valine, leucine, lysine, but particularly aspartic acid, or tyrosine.

Preferably, the amino reagent will comprise at least three amino acids additional to cysteine or cystine. In addition to the amino acids mentioned previously there may be mentioned: glycine, alpha or beta-alanine, arginine, iso-leucine, histidine or serine, whilst other amino acids can be used.

It is not essential to use individual amino acids. Salts, such as monosodium glutamate, simple compounds, such as esters or hydroxy compounds, peptides or proteins which will give rise to the desired amino acids under the conditions of reaction, may be used. Both racemic and naturally-occurring forms of the amino acids may be used.

Fish protein is a suitable starting material for obtaining a mixture of amino acids for the reaction, provided that cysteine or cystine is added. Crude fish protein, such as cod flesh, may be used, but preferably, the fish should first be deflavored, for instance, by the process described in United States Patent No. 2,813,207. The fish protein is then hydrolyzed, for instance, by means of hydrochloric acid or caustic soda, and substantially neutralized. The substantially neutralized hydrolyzate may be used, as such, as the amino reagent, provided cysteine or cystine is added. The hydrolyzate may be treated, for instance, with charcoal, in order to remove amounts of certain readily adsorbed amino acids and the charcoal treated hydrolyzate is generally preferred but cysteine or cystine or a source thereof will generally require to be added before such charcoal treated hydrolyzates are used. Whilst amounts of tyrosine may be used with cysteine or cystine in the absence of substantial amounts of other amino acids, the use of tyrosine in admixture with more than two other amino acids is not recommended, as such mixtures may give rise to undesirable side flavors.

Other protein hydrolyzates such as groundnut hydrolyzate or casein hydrolyzate or mixtures of these, which have preferably been suitably treated to remove readily adsorbed amino acids, may also be used as the amino reagent, provided cysteine or cystine or a source thereof is added.

Factors which may affect the nature and quality of the flavor produced include the nature and relative amounts of the amino reagent and fractionated liquid wood smoke used, the amount of water present and the time and temperature of heating.

When either one or two amino acids, or sources thereof, additional to cysteine and cystine are present, cysteine and cystine should preferably constitute a higher proportion of the amino reagent than when three or more amino acids, or sources thereof, additional to cysteine and cystine are present. Preferably, when either one or two amino acids, or sources thereof additional to cysteine and cystine, are present, the amino reagent should contain 0.1 to 0.5 times, by weight of the weight of cysteine and cystine present, of amino acids additional to cysteine and cystine or amounts of derivatives such as will give rise to an equivalent weight of such amino acids. When three or more amino acids, or sources thereof, additional to cysteine and cystine are present, the amino reagent should preferably contain from 0.5–20 times, by weight of the weight of cysteine and cystine present, of amino acids additional to cysteine and cystine, or amounts of derivatives such as will give rise to an equivalent weight of such amino acids.

The proportion of fractionated liquid wood smoke which it is preferred to use will be defined in terms of the fraction of fractionated liquid wood smoke of boiling point greater than 40° C. at a pressure of 15 mms., dissolved in 100 volumes of water per 1 volume of fraction. This solution is referred to below, for convenience, as "smoke solution" and the amount of any fractionated liquid wood smoke which it is preferable to use may be determined by reference to this solution.

The nature of the flavor imparted by the flavoring substance may be varied, for instance, from that of a heavily smoked ham flavor to that of a lightly smoke bacon flavor by variation of the proportion of fractionated liquid wood smoke and the proportion and composition of the amino reagent used during the preparation of the flavoring substance.

It is preferred to use from 1 to 20 parts of cysteine and cystine, by weight, per 200 parts of smoke solution. In general, the proportion of total amino reagent to smoke solution will be in the range 5 to 120 parts by weight, of amino reagent per 200 parts of smoke solution but it will be realized that these proportions can be varied within wide limits depending on the nature of the flavor which it is desired to impart.

The amount of water present should preferably be at least 5, generally 10 to 200 times, by weight, of the amino reagent. Amounts up to about 1500 times may be used but the limit of dilution which is practicable will generally be set by the proportion of fractionated liquid wood smoke used.

The pH at which the reaction is carried out is not critical although the pH of the mixture should preferably not be alkaline. It is preferred to carry out the reaction at a pH of between 1 and 4.

The reaction mixture may be in the form of a solution or slurry or sludgy mass depending on the concentration of reagents and conditions of reaction. Vigorous stirring during heating may assist completion of the reaction.

The reaction may be carried out by heating the mixture under reflux; the mixture should be heated for at least ¼ hour and generally it is preferred not to continue heating at reflux temperature for more than about 20 hours, 2 to 4 hours heating at reflux temperature being preferred. The reaction may also be carried out by heating the mixture for a longer period at a lower temperature. Thus, for instance, the reaction may be carried out by heating the mixture for 15 hours at 90° C. or for 30 hours at 70° C. Longer heating at lower temperatures may also be employed. The reaction may be carried out under reduced or increased pressure if desired.

The reaction may also be carried out by adding the reagents to a food product in which it is desired to incorporate a flavor according to the invention and then heating the product to effect reaction, for instance, by autoclaving in a sealed can.

The reaction products may be used as such or they may be converted to dry powders by, for instance, roller or freeze drying. Such powders will generally be hygroscopic.

Flavoring substances according to the invention may be incorporated in a wide range of products. They may be incorporated either as solutions or powders, as is convenient, in protein gels, meat spreads, dry soup mixes, luncheon meats, rissoles, or they may be added to cooking fat to impart the flavor of ham or bacon thereto.

The flavoring substances may be used in artificial food products or they may be used to enhance the flavor of natural ham or bacon products. The solutions of the flavoring substances are stable for only a few days but the dried powders may remain stable for months. It is preferred to let the flavoring substance age for about 1 day after its preparation in order to attain optimum flavor.

The following examples illustrate the invention.

Example 1

Deflavored cod flesh (30 grams) was hydrolyzed by refluxing with 6 N-hydrochloric acid (200 grams) for 8 hours. The acid was substantially distilled off at reduced pressure and the residual hydrolyzate after addition of water was filtered and brought to pH 6.7 with caustic soda. The dark colored solution was then passed through a short column (3" x 2") of activated charcoal giving a water-white solution. This solution (300 ml., containing 4.2 gm. of Kjeldahl nitrogen/ml.) was heated under reflux with L-cysteine hydrochloride (6 g.) and smoke solution (200 ml.) for 3 hours in an oil bath heated to 135° C.

The resultant clear brown solution was cooled and freeze-dried to a free-running powder possessing the aroma and taste of smoked ham.

The smoke solution was prepared as follows:

1200 grams of oak sawdust was heated at about 400° C. in the presence of a controlled current of air of 5 cu. ft. per hour in a kiln, the sawdust having a surface area of 400 sq. ins. during heating. The distillate obtained was fractionated to remove tars in suitable apparatus, and the residue concentrated by distillation at a temperature of 40° C. at a pressure of 15 mms. Hg. The concentrated residue obtained was diluted with a 10 fold volume of water, that is, to the original volume before concentration. Any undissolved matter was filtered off. This solution was then diluted 10 fold with distilled water and used as "smoke solution."

Example 2

| | | |
|---|---|---|
| L-cysteine hydrochloride | g | 6 |
| Aspartic acid | g | 1.86 |
| Smoke solution (prepared as described in Example 1) | mls | 200 |

The above ingredients were heated together under reflux in a roundbottom flask in an oil bath maintained at 135° C. for 3 hours. The resultant clear brown solution had a taste and aroma of smoked bacon.

Example 3

| | | |
|---|---|---|
| L-cysteine hydrochloride | g | 10 |
| Smoke solution (prepared as described in Example 1) | mls | 300 |

The above ingredients were mixed and heated in a roundbottomed flask, under reflux, for 3 hours in an oil bath at 130° C. The resultant solution had a taste and aroma resembling that of smoked ham.

Example 4

| | | |
|---|---|---|
| L-cysteine hydrochloride | g | 6 |
| Lysine | g | 1.26 |
| Smoke solution (prepared as described in Example 1) | mls | 200 |

The above ingredients were mixed and heated together under reflux in a roundbottomed flask in an oil bath maintained at 135° C. for 12 hours. The resultant solution had a taste and aroma resembling that of smoked ham.

Example 5

| | | |
|---|---|---|
| L-cysteine hydrochloride | g | 6 |
| Proline | g | 0.54 |
| Arginine | g | 0.81 |
| Tyrosine | g | 0.09 |
| Smoke solution (prepared as described in Example 1) | ml | 200 |

The above ingredients were mixed and heated together under reflux in a roundbottomed flask in an oil bath maintained at 90° C. for 30 hours. The resultant solution had a taste and aroma resembling that of smoked ham.

Example 6

| | | |
|---|---|---|
| L-cysteine hydrochloride | g | 0.72 |
| Cod fish hydrolyzate | ml | 36 |
| Smoke solution (prepared as described in Example 1) | ml | 24 |

The mixture of the above ingredients was added to a mixture of soya protein (35 g.) in water (140 ml.). The resultant slurry was sealed in a can and autoclaved for 1½ hours at a pressure of 10 lbs. per sq. in. On opening the can several weeks later, the protein gel was found to have a taste and aroma reminiscent of smoked ham.

We claim:

1. The process of preparing a flavoring substance capable of imparting the aroma and flavor of a smoked pork product to foodstuffs which comprises reacting fractionated liquid wood smoke in the presence of water at an elevated temperature with at least one compound of the group consisting of cysteine and cystine.

2. The process of preparing a flavoring substance capable of imparting the aroma and flavor of a smoked pork product to foodstuffs which comprises reacting fractionated liquid wood smoke in the presence of water at an elevated temperature with at least one compound of the group consisting of cysteine and cystine, and at least one additional amino acid.

3. The process of claim 2 in which at least three additional amino acids are present in the reaction mixture.

4. The process of claim 1 in which the fractionated liquid wood smoke is substantially completely freed from tar.

5. The process of claim 1 in which a fraction of fractionated liquid wood smoke of boiling point greater than 40° C. at a pressure of 15 mms. is used.

6. The process of claim 1 in which at least one amino acid selected from the group consisting of glycine, alpha and beta-alanine, arginine, iso-leucine, histidine, serine, threonine, proline, glutamic acid, valine, leucine, lysine, aspartic acid and tyrosine is present in the reaction mixture.

7. The process of claim 1 in which a hydrolyzed protein is present in the reaction mixture.

8. The process of claim 1 in which the reaction is carried out at a pH of between 1 and 4.

9. The process of claim 1 in which the amount of water present is at least 5 times by weight of the weight of the total acids present in the reaction mixture.

10. The process of claim 1 in which the reaction is carried out by heating the mixture under reflux for from ¼ to 20 hours.

11. The process of claim 1 in which a fraction of fractionated liquid wood smoke of boiling point greater than 40° C. at 15 mms. dissolved in 100 parts water per 1 volume of fraction is used, the weight ratio of cysteine and cystine to smoke solution being from 1 to 20 parts of cysteine and cystine per 200 parts of smoke solution.

12. The process of claim 1 in which the amino reagent contains from 0.1 to 20 times by weight of the weight of cysteine and cystine present of amino acids additional to cysteine and cystine.

13. The process of incorporating the flavor of smoked pork in a food product which comprises the steps of mixing with the food product fractionated liquid wood smoke and a compound from the group consisting of cysteine and cystine and heating the food product to an elevated temperature in the presence of water.

14. The process of preparing a flavoring substance capable of imparting the aroma and flavor of a smoked pork product to foodstuffs which comprises reacting fractionated liquid wood smoke with cysteine in the presence of water at an elevated temperature.

15. The process of preparing a flavoring substance capable of imparting the aroma and flavor of a smoked pork product to foodstuffs which comprises reacting fractionated liquid wood smoke with cysteine and at least one additional amino acid in the presence of water at an elevated temperature.

16. The process of claim 15 in which the one additional amino acid is selected from the group consisting of glycine, alpha and beta-alanine, arginine, iso-leucine, histidine, serine, threonine, proline, glutamic acid, valine, leucine, lysine, aspartic acid and tyrosine.

17. The process of incorporating the flavor of smoked pork in a food product which comprises the steps of mixing fractionated liquid wood smoke and cysteine with the food product and heating the food product to an elevated temperature in the presence of water.

18. A novel flavoring substance adapted to impart the flavor and aroma of smoked pork products to foodstuffs comprising the product of the reaction of frictionated wood smoke and an amino acid from the group consisting of cysteine and cystine at an elevated temperature in the presence of water.

19. A novel food product having the flavor and aroma of a smoked pork product, said flavor and aroma having been developed by adding fractionated wood smoke and an amino acid from the group consisting of cysteine and cytine to the food product and subjecting the food product to an elevated temperature in the presence of water.

20. A novel flavoring substance adapted to impart the flavor and aroma of smoked pork products to foodstuffs comprising the product of the reaction of fractionated wood smoke and cysteine at an elevated temperature in the presence of water.

References Cited in the file of this patent

UNITED STATES PATENTS

| | | |
|---|---|---|
| 2,049,576 | Ungnade | Aug. 4, 1936 |
| 2,129,047 | Colgin | Sept. 6, 1938 |
| 2,338,156 | Allen | Jan. 4, 1944 |
| 2,414,299 | Hall | Jan. 14, 1947 |
| 2,687,356 | Fraticelli | Aug. 24, 1954 |

UNITED STATES PATENT OFFICE

CERTIFICATE OF CORRECTION

Patent No. 2,918,376                  December 22, 1959

Charles Gerard May et al.

It is hereby certified that error appears in the printed specification of the above numbered patent requiring correction and that the said Letters Patent should read as corrected below.

Column 5, line 52, after "total" insert -- amino --; column 6, line 36, for "frictionated" read -- fractionated --; line 44, for "cytine" read -- cystine --.

Signed and sealed this 12th day of July 1960.

(SEAL)
Attest:

KARL H. AXLINE                         ROBERT C. WATSON
Attesting Officer                    Commissioner of Patents